Oct. 5, 1954 F. L. HILTON 2,691,094

RADIO CONTROL CIRCUIT

Filed Sept. 26, 1951 2 Sheets-Sheet 1

INVENTOR.
Frederick L. Hilton
BY
Foorman L. Mueller
Atty.

Oct. 5, 1954 F. L. HILTON 2,691,094

RADIO CONTROL CIRCUIT

Filed Sept. 26, 1951 2 Sheets-Sheet 2

INVENTOR.
Frederick L. Hilton

BY
Foorman L. Mueller
Atty

Patented Oct. 5, 1954 2,691,094

UNITED STATES PATENT OFFICE 2,691,094

RADIO CONTROL CIRCUIT

Frederick L. Hilton, Bensonville, Ill., assignor to Motorola, Inc., Chicago, Ill., a corporation of Illinois Application September 26, 1951, Serial No. 248,410

9 Claims. (Cl. 250—13)

Figure 1:
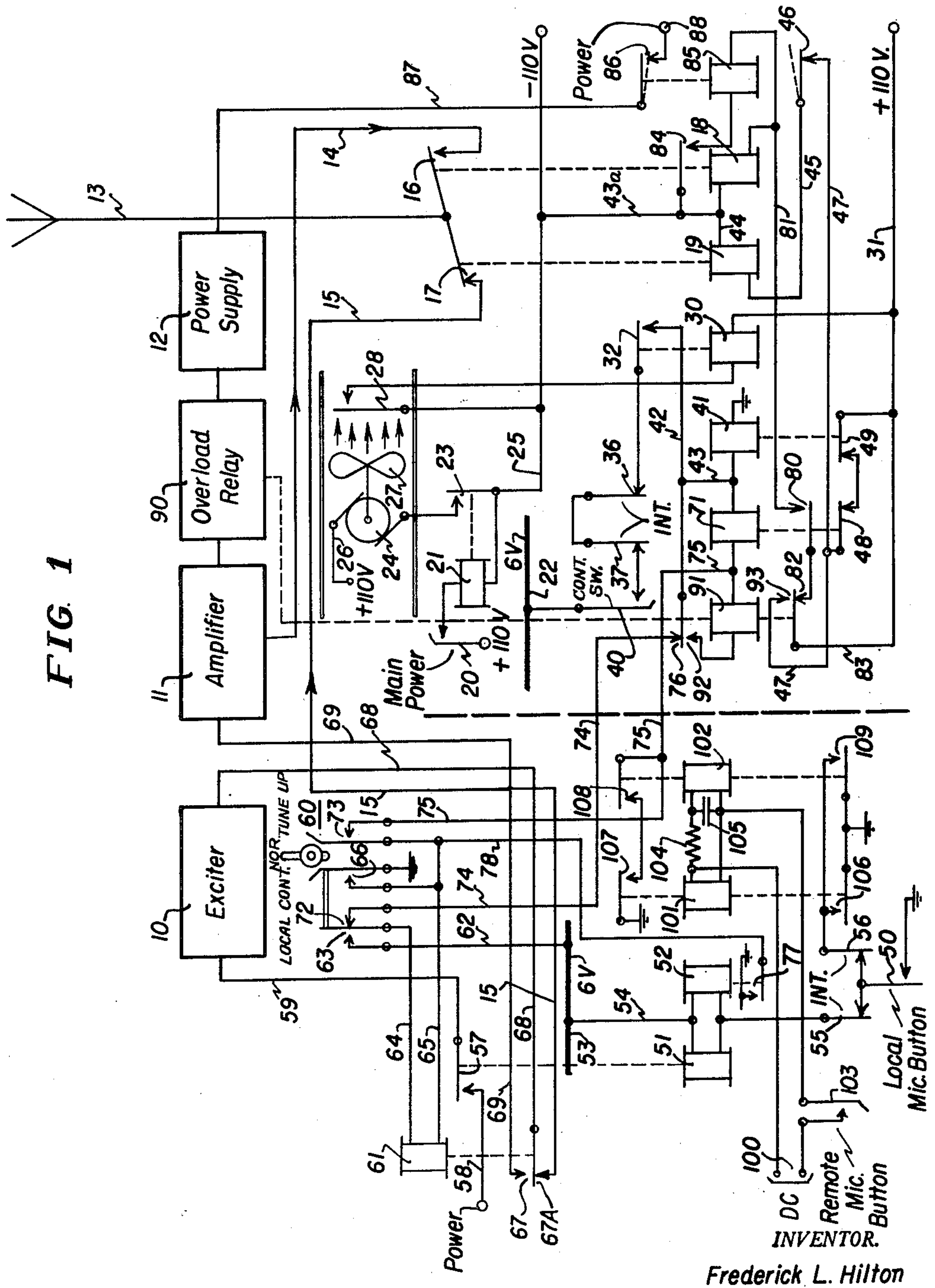

The present invention relates generally to automatic control circuits for radio communication systems and more particularly to antenna switching and power sequence control circuits for a local or remotely controlled radio communication system.

In the operation of remotely controlled radio frequency transmitters of the type having separately energized low power exciter and high power amplifier stages together with their associated direct current plate power supply circuits, it has been found desirable to sequence the energization of the various stages in order to prevent damage to the circuit components. For example, it is desirable to secure full energization and operation of the exciter stage before the power amplifier stage is energized. Similarly, it is desirable, when turning off the transmitter, to deenergize the power amplifier stage before deenergizing the exciter stage thus preventing such damage to the power amplifier tubes as might result from their energization with no excitation of their control grids. When such remotely controlled transmitter systems employ tubes cooled by forced air, it is also desirable to provide means for automatically deenergizing the entire transmitter in the event of failure of the air blower system.

Remotely controlled radio frequency transmitters of the type referred to above are frequently used as vital links in important communication services such as police and fire dispatching systems and it is therefore desirable to provide for continued operation of the transmitter at low power in the event that high power operation is inadvisable or impossible due to overload conditions in the final high power amplifier. Such operation may be obtained when using a transmitter circuit combination of low power exciter and final power amplifier, by switching the transmitting antenna from the final power amplifier to the output of the exciter and at the same time deenergizing the power amplifier.

It is a principal object of the present invention to provide a radio frequency communication system that is automatically controlled to continue transmitter operation at low power in the event that high power operation is inadvisable or impossible due to overload conditions.

Another object of the invention is to provide a radio frequency communication system that is automatically controlled to continue transmitter operation at low power in the event of overload and which will automatically be restored to full transmitting power after the conclusion of the low power transmitter operation and the beginning of a successive period of transmission.

Yet another object of the present invention is to provide an automatically controlled radio frequency communication system which is automatically operable with the same antenna for the transmitter under low or high power operation and for receiving.

A further object of the present invention is to provide an automatic sequencing system for controlling the energization and deenergization of the various transmitter stages in desired sequences to minimize damage to the various stages due to improper loading or other conditions.

A still further object of the present invention is to provide a simple and automatic control circuit for a radio frequency communication system which permits selection of either remote or local control, and which facilitates tune-up procedures under local control.

A principal feature of the present invention is the provision of an automatic control system for a radio transmitter having separately energized low and high power amplifier stages, which control system will be automatically responsive to overload conditions of the high power amplifier to deenergize such amplifier and automatically switch the antenna from the output circuit of the high power amplifier to the low power output circuit.

A further feature of the invention is the provision of a control system for a transmitter as described above, which automatically reenergizes and reconnects the power amplifier to the antenna after previous disconnection due to overload conditions, and which is operative upon release of the push-to-talk switch and a subsequent reclosing of the push-to-talk switch. Provisions may also be included to automatically switch the transmitting antenna from the transmitter or exciter to a receiver whenever the push-to-talk switch is released.

Another feature of the present invention is the provision of an improved power control system for a remotely controlled radio frequency transmitter including separately energized exciter and power amplifier stages, the control system having means to automatically and sequentially energize first the plate circuits of the exciter and thereafter the plate circuits of the power amplifier and to sequentially deenergize the exciter and power amplifier plate circuits in reverse sequence whenever the remote control push-to-talk switch is manipulated to energize or deenergize the transmitter as the case may be.

The communication system of the present invention also provides a novel power control circuit for a remotely controlled forced-air-cooled transmitter which automatically deenergizes the power amplifier of the transmitter in the event of failure of the air blower in order to subsequently reenergize the power amplifier from either a local or remote position.

In a preferred embodiment of the invention the transmitter control system is provided with a manual selector switch to be operated to enable local control of the energization of the power amplifier plate circuits by a local push-to-talk microphone switch and further includes automatic means for switching the antenna to the output of the power amplifier when the power amplifier is energized together with means assuring the connection of the power amplifier output to the antenna at all times that the power amplifier is energized except during times when overload conditions exist in the power amplifier.

Figure 2:
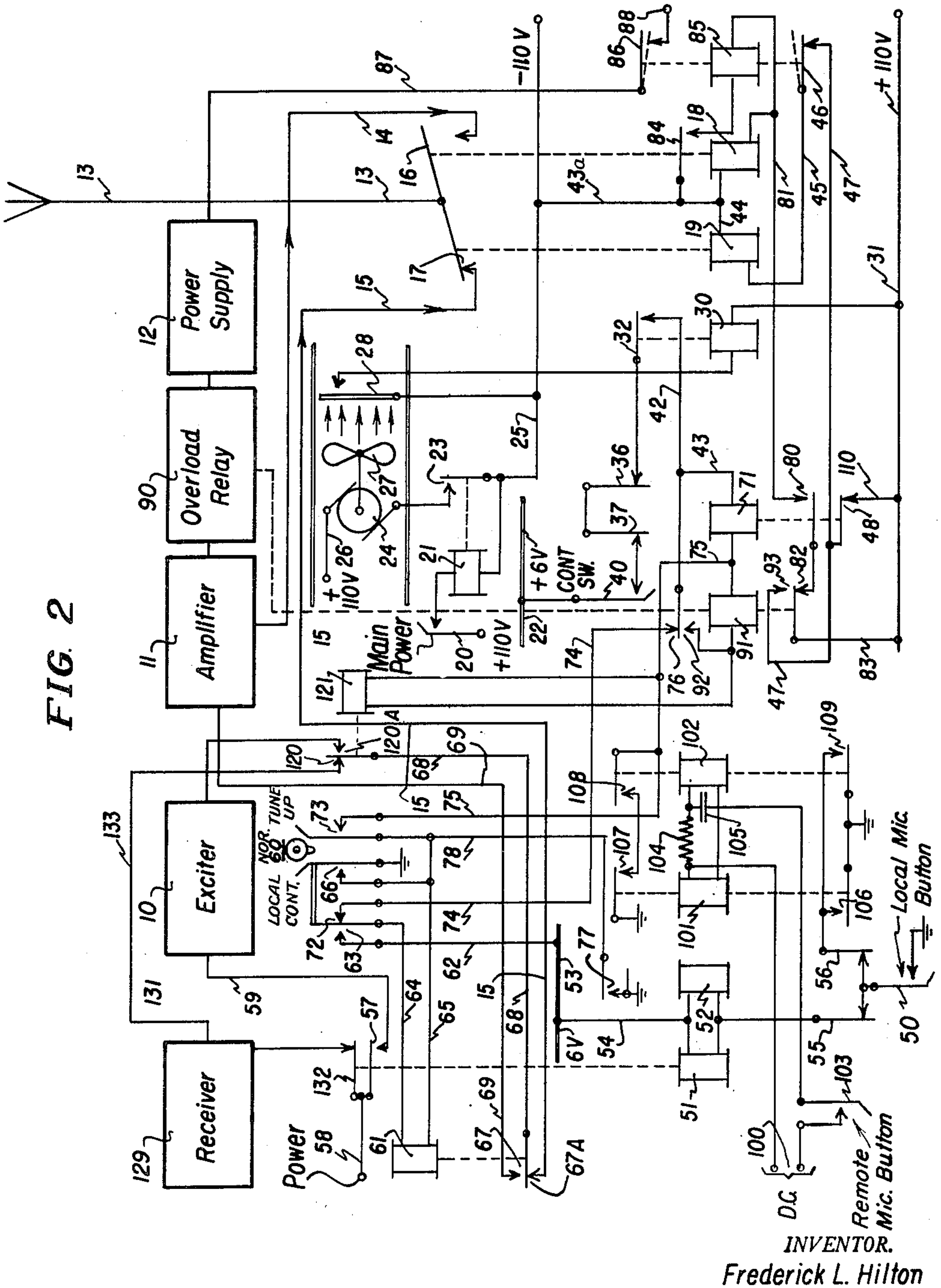

Further objects, features, and advantages of the present invention will be apparent from a consideration of the following specification and drawings in which:

Fig. 1 is a schematic diagram of the transmitter control system and relays connected for controlling the exciter, power amplifier and power amplifier power supply; and Fig. 2 is a schematic diagram showing a modified form of the invention in which is shown a radio communication system having a control circuit providing for automatic switching of the antenna from transmitter to receiver.

The invention in its preferred embodiment comprises a radio communication system having an automatic control system including a plurality of switches and relays for energizing and deenergizing the various stages of the transmitter in desired sequences. The transmitter proper consists of separately energized low and high power stages and an antenna. Switch means responsive to an overload condition in the high power stage is provided to automatically control the energization of the high and low power stages and to switch the antenna from the high to the low power stage to enable continued operation of the transmitter at low power. The control system including the overload responsive switch may be operated by the push-to-talk switch of either a local or a remote microphone. The system is effective to reenergize the high power stage and again switch the antenna thereto after the completion of a transmitting period and the beginning of a successive period of transmission. If the overload condition still exists, the transmitter will again be switched to low power operation. The control system is also provided with a manual selector switch having three positions of operation to enable the control system to function by remote control, by local control, and to energize only the exciter or low power circuit for tune-up purposes. The transmitter is cooled by forced air and the control system includes an air switch that will deenergize the power amplifier of the transmitter in the event of air failure.

In another embodiment of the invention the communication system includes a receiver which is operative during periods when the transmitter is not operative. The control system in this embodiment further provides antenna switching means to automatically connect the antenna to the receiver whenever the transmitter push-to-talk control switch is released.

Referring to Fig. 1 of the drawings, an exciter 10, final power amplifier 11, and power amplifier power supply 12 which may be conventional units are shown in block form. A transmitting antenna 13 is shown to be connected to either the output of the power amplifier by line 14, or the output of the exciter by line 15, through means of the antenna switch contacts 16 and 17 controlled by relays 18 and 19, respectively. Antenna switch contacts 16 and 17 are of the interlocked type that are operated simultaneously to close one and open the other upon the energization of either relay coil 18 or relay coil 19, respectively.

A main power switch 20, when closed, energizes the 110 volt relay coil 21 by connecting the coil from the line 25 to the plus 110 volt terminal. The energization of relay coil 21 closes switch contacts 23 to connect the air blower motor 24 with the 110 volt lines 25 and 26 thus starting the operation of the blower motor. As soon as the blower motor 24 and fan 27 reach their normal operating speed the air flow switch contacts 28 are closed to connect the relay coil 30 across the 110 volt lines 25 and 31, thus closing the contacts 32, to be mentioned later.

Conventional forms of cabinet interlock switches 36 and 37 are shown in their closed position. It should be understood that when the cabinet doors of the power amplifier 11 are opened, the interlock switches 36 and 37 will also be opened to prevent the application of plate voltage to the power amplifier as will be presently described.

The power control circuit of the exciter 10 and its operation for purposes of tuning the exciter will now be described. Assuming the main power switch 20, and relay switches 23 and 32 to be closed, the blower motor 24 energized so that air operated switch 28 is closed, and the interlock switches 36 and 37 closed as in the normal transmitter warm-up operation, the transmitter control switch 40 is now manually closed to energize the six volt relay coil 41 from the line 22 through interlock switches 36, 37, switch contacts 32 and lines 42 and 43 to ground. It will be noted that the antenna switch relay coil 19 has been energized from the 110 volt line 25 through lines *43a*, 44 and 45, the normally closed switch contacts 46, line 47 and normally closed switch contacts 48 and 49 to 110 volt line 31, but the present energization of relay coil 41 opens switch contacts 49 to deenergize the antenna switch coil 19 and thus condition switch 17 to be opened when relay 18 is subsequently energized to close switch 16 and transfer antenna 13 from the line 15 to the line 14. Now, upon closing the local microphone or push-to-talk switch 50, the six volt relay coils 51 and 52 will be energized from the six volt line 53 to ground through line 54 and the normally closed door interlock switches 55. Switch 56 is also an interlock in the exciter cabinet. The energization of relay 51 closes contacts 57 and connects power from the power source 58 through line 59 to the exciter 10 thus energizing the exciter.

It will be noted that a multiple circuit phone type manual selector switch 60 is shown, having three positions, a normal mid-position for remote control operation of the transmitter, an exciter tune-up position to the right on the drawing, and a local transmitter control position to the left on the drawing. With the manual selector switch 60 moved to the right in the exciter tune-up position, the six volt relay coil 61 is energized from the six volt line 53 to ground through line 62, now closed switch contacts 63, lines 64 and 65 and the now closed switch contacts 66. The energization of relay coil 61 closes switch contacts 67 and opens switch contacts 67A to connect the output of the exciter 10 through lines 68 and 69 to the input of the power amplifier thus properly loading the exciter output circuits for purposes of tune-up. After tuning, the exciter 10 may be deenergized by opening the local push-to-talk switch 50 and deenergizing relay 51 to open contacts 57 and break the power supply circuit to the exciter.

Now assuming the exciter to be properly tuned, the details and operation of the transmitter control system under local control will be described. The manual selector switch 60 is moved to the left or local control position and it will be assumed that all switch contacts 20, 23, 28, 32, 36, 37 and 40 are closed as previously described for the transmitter warm-up operation, the relay coil 61 is now connected in parallel with relay coil 71 through lines 64, 65, now closed switch contacts 72, 73, lines 74, 75, normally closed switch contacts 76 and lines 42 and 43. When the local push-to-talk microphone switch 50 is closed, relays 51 and 52 are again energized as previously described and switch contacts 77 are closed to connect lines 78 and 65 to ground. In such manner both the six volt relay coils 61 and 71 are energized from the six volt line 22 through closed switches 40, 37, 36, 32, and 76 together with lines 42, 43, 74, 75, 64, 65 and closed switch 73 through line 78 and closed switch contacts 77 to ground. The energization of relay 61 connects the output of the exciter to the input of the power amplifier as previously described. The energization of relay 71 opens switch contacts 48 to assure deenergization of the antenna switch relay 19, and simultaneously closes switch contacts 80 to connect the 110 volt antenna switch relay coil 18 to 110 volt line 25 through line 43*a*, and to the 110 volt line 31 through line 81, and normally closed switch contacts 82 and line 83. Relay coil 18 closes contacts 16 to connect the antenna 13 to the output of the power amplifier 11. The energization of antenna switch relay coil 18 also closes switch contacts 84 to energize the 110 volt relay coil 85 through lines 43*a* and 81 and close the switch contacts 86 to apply power in line 87 from the power source 88 to the power amplifier plate power supply 12 and thus energize the power amplifier 11. It will also be noted that the normally closed switch contacts 46 are opened by the energization of relay coil 85 to provide further assurance that antenna switch relay coil 19 will be deenergized and the output of the transmitter power amplifier 11 will be connected to the antenna. Switch contacts 46 also perform a function to be later described in connection with the automatic antenna switchover under overload conditions.

As described above, when the manual selector switch 60 is in the left or local control position and the main power and transmitter control switches 20 and 40 are closed, and assuming the blower motor is operating properly to close the air switch contacts 28, the transmitter may be energized and operated under local control by closing the local push-to-talk switch 50. In the event of overload in the power amplifier, the overload relay diagrammatically shown at 90 will become operative. The overload relay 90 may be responsive to the current drawn by the power amplifier 11 from the power supply 12 and thereby operate when the amplifier is overloaded. The relay 90 is connected with the relay 91 which thus far in the normal operation of the transmitter has remained deenergized. The interconnection between the relays 90 and 91 may be either mechanical or electrical and are represented by the dotted line in Fig. 1. The six volt relay 91 serves to provide a holding circuit for the overload relay 90 so that the operation of the overload relay 90 opens normally closed switch contacts 76 and closes switch contacts 92 to energize the six volt holding coil 91 through lines 42 and 75, closed switch contacts 73, line 78 and closed switch contacts 77 to ground. (Manual selector switch 60 in the local control position.) With the overload relay holding coil 91 energized, under conditions of overload in the power amplifier, and the normally closed contacts 82 thereby is opened, relay 85 is deenergized and opens switch contacts 86 to disconnect the power to the power amplifier power supply 12. At the same time, the transmitter antenna switch relay 18 is deenergized to condition the antenna switch for automatic switchover to the output of the exciter. The previously described deenergization of relay coil 85 closes switch contacts 46 to connect the antenna switch relay coil 19 to the 110 volt line 31 through lines 45 and 47, now closed switch contacts 93 of the overload relay holding coil 91, and line 83. The relay coil 19 is permanently connected to the 110 volt line 25 through lines 44 and 43*a*. Thus under local control operation, when overload conditions exist to operate the overload relay 90 and energize its holding coil 91, the power amplifier 11 is deenergized and the antenna 13 is switched from the output of the power amplifier 11 to the output of the exciter 10. It should be noted that relay coil 61 is also deenergized upon the opening of the normally closed switch contacts 76 to open switch contacts 67 and close switch contacts 67A and disconnect the output of the exciter from the input of the power amplifier and to the antenna line 15.

As soon as the local push-to-talk switch 50 is released to deenergize the plate supplies of both the exciter and power amplifier as previously described, the overload relay holding coil 91 is deenergized due to the opening of the grounding switch contacts 77 and the normally closed switch contacts 76 and 82 are again closed so that a subsequent closing of the local push-to-talk switch 50 causing energization of relay coil 71 will energize relay coils 18 and 85 to energize the exciter and power amplifier and switch the antenna 13 from the exciter to the power amplifier. It will therefore be understood that relay and circuit means have been described to automatically switch the antenna from output of the power amplifier to the output of the exciter while at the same time deenergizing the power amplifier in the event of overload conditions and to automatically reenergize the power amplifier and switch its output again to the antenna following a release and subsequent closing of the local push-to-talk button when the transmitter system is operating under local control.

The details and operation of the transmitter control system under remote control conditions will now be described. It will be assumed that the transmitter warm-up procedure has been followed and only those elements of the system that are essential to an understanding of the remote control operation will be again described. The manual selector switch 60 is set in the mid or normal position, as shown, for the remote control operation. A remote source of direct current 100 is provided to energize relays 101 and 102 upon closing of the remote push-to-talk microphone switch 103. A resistor condenser network comprising the resistor 104 and condenser 105 is connected to provide a time delay so that the relay coil 101 is energized an appreciable time before relay coil 102. The energization of relay coil 101 closes switch contacts 106 and 107, the closing of switch contacts 106 effecting the same result in energizing the exciter 10 as previously described when the local push-to-talk switch 50 is closed. After the above-mentioned time interval sufficient to assure energization of the exciter, the relay coil 102 becomes energized to close switch contacts 108 and ground line 75 to cause a subsequent energization of the power amplifier as has been described before when line 75 was grounded through switch contacts 73 and 77 which were closed by the previously described local control operation of the selector switch 60 of the transmitter. The automatic overload responsive switching system operates for remote control in the same manner as previously described for the local control operation except that line 75 is now grounded through the closed switch contacts 107 and 108. Similarly, to restore the power amplifier to full operation after an overload switch over it is only necessary to release and subsequently depress the remote push button 103.

It will be noted that the relay coil 102 is also provided with grounding switch contacts 109 which are closed when the coil is energized. Thus the energization of the exciter 10 is controlled by either the closing of switch contacts 106 or 109. When the push button 103 is released, relay coil 101 is immediately deenergized to open switch contacts 106, 107 and deenergize only the power amplifier of the transmitter. After a time sufficient to discharge condenser 105, the relay coil 102 is deenergized to open switch contacts 109 and since switch contacts 106 have been previously opened the exciter 10 is then deenergized. It will therefore be understood that the resistor 104 and condenser 105 together with the arrangement and connection of switch contacts 106–109 as described above provides for the automatic energization of the exciter before the power amplifier and a subsequent deenergization of the power amplifier before the exciter under remote control conditions of operation.

Now referring to Fig. 2 of the drawings, a modified form of the invention providing for automatic switching of the antenna to the exciter circuit whenever the final amplifier is deenergized and further providing for automatic switching of the antenna to a receiver whenever both the final amplifier and exciter are deenergized will be described. The circuit of Fig. 2 is very similar to the previously described circuit of Fig. 1 and all circuit elements in Fig. 2 which function the same as corresponding elements in Fig. 1 will be given the same reference numeral and will not be further described in detail. It will be noted that in Fig. 2, the relay coil 41 and switch contacts 49 of Fig. 1 have been omitted, and a direct connection 110 from switch contacts 48 to line 31 has been inserted. This change is effective to cause relay coil 19 to become energized every time that relay coils 18 and 85 are deenergized to deenergize the final amplifier either under overload conditions when relay coil 71 has been deenergized and the normally closed switch contacts 48 have been closed and the normally open switch contacts 30 have been opened or when only the exciter is energized for purposes of tuning. Since the relay coil 71 is also deenergized whenever the local or remote control push buttons 50 or 103 are released, it is apparent that the antenna 13 will be switched to line 15 whenever the plate power to the final amplifier is disconnected.

As shown in Fig. 2 of the drawings, in order that the antenna connection through switch contacts 17 and line 15 may be made with the output of the exciter 10 whenever overload conditions occur in the final amplifier, the switch contacts 120 and 120A shown in their normal position are provided to be operated by the energization of relay coil 121, which is connected in parallel with the overload holding coil relay 91. It will be remebered that relay coil 61 is deenergized whenever the overload relay holding coil 91 is energized, thus opening switch contacts 67 and closing switch contacts 67A to disconnect the output of the exciter from the input of the final amplifier and to the antenna in line 15.

The receiver shown by block outline at 129 in Fig. 2 may be controlled by the same control circuit as the transmitter, and may be connected to the antenna 13 whenever the local or remote push-to-talk buttons are released. As previously described, relay coils 51 and 52 are energized whenever either push button 50 or 103 is depressed. The antenna of the receiver 129 is connected by line 133 with line 15 through switch contacts 120, line 68, and switch contacts 67A to thus connect the antenna through antenna switch contacts 17 which are always closed when the plate power of the final amplifier is deenergized as previously described above. An additional pair of normally closed switch contacts 132 are provided to be operated by relay 51 to supply plate power to the receiver whenever relay 51 has been deenergized in the manner to deenergize the plate circuits of the exciter. In such manner automatic switching of the antenna to the receiver is accomplished whenever the remote or local push-to-talk buttons are released without interfering with the relay circuits providing the switching operations of the antenna from the final amplifier to the exciter during overload conditions in any transmitting period.

In the foregoing, a transmitter control system has been described which is operative for either local or remote control and which provides an automatic switchover from high power to low power in the event of overload of the high power circuits and which further provides a sequential energization and deenergization of the various exciter and power amplifier units of the transmitter when operated under remote or local control conditions. When operated under local control conditions the desired sequential energization is obtained by the movement of the manual selector switch 60 to the local control position and the closure of the control switch 40 to cause the power amplifier to be energized before the exciter can be energized by operation of the local push-to-talk switch 50. The local push-to-talk switch 50 is not effective until switches 40 and 60 have been operated as described. Control switch 40 may be independently opened to allow the exciter to be operated without operating the main power amplifier in case of repairs to the main power amplifier.

In the event of failure of the blower motor 24 or fan 27, the air switch 28 is opened to disable the filament and high voltage circuits of the power amplifier of the transmitter at the same time switching the antenna to the exciter or receiver. Original conditions can only be restored to operation by a subsequent closing of the air switch. However, a switchover of the antenna from power amplifier to exciter will be switched back automatically upon release and subsequent depression of either the local or remote push-to-talk button switches and the transmitter will again operate at full power until another overload condition arises.

In one embodiment of the communication system of the invention a receiver has been included to be operative at all times that the remote or local push-to-talk switch is released, the control system providing automatic means to transfer the antenna to the receiver at such times when the transmitter is deenergized.

Although a specific embodiment of the invention has been described, it should be understood that various changes and modifications can be made without departing from the intended scope of the invention as defined in the appended claims.

I claim:

1. A radio frequency communication system including in combination, a receiver, a transmitter having high and low power stages, an antenna, a push-to-talk switch, first normally open switch means adapted when closed to energize said low power stage, second normally open switch means adapted when closed to energize said high power stage, a first antenna switch for switching said antenna between the input circuit of said receiver and the output circuit of said high power transmitter stage, means responsive to the closing of said push-to-talk switch for closing said first and second switch means, means responsive to operation of said push-to-talk switch for operating said antenna switch to connect said antenna to the input circuit of said receiver when said push-to-talk switch is released and to connect said antenna to the output circuit of said high power stage when said push-to-talk switch is closed, a second antenna switch to transfer the antenna from the output of said high power stage to the output of said low power stage, said high power stage including means connected to said second switch means and responsive to an overload condition of said high power stage for opening said second switch means, said overload responsive means also operating said second antenna switch to transfer the antenna to the output of said low power stage.

2. A radio frequency communication system including in combination, a receiver, a transmitter having separately energized high and low power stages, an antenna, a push-to-talk switch, first normally open switch means adapted when closed to energize said low power stage, second normally open switch means adapted when closed to energize said high power stage, a first antenna switch for selectively connecting said antenna to the input circuit of said receiver and to the output circuit of said high power stage, a second antenna switch for switching said antenna between the output circuit of said high power stage and the output circuit of said low power stage, means responsive to the closing of said push-to-talk switch for closing said first and second switch means, means responsive to operation of said push-to-talk switch for operating said first antenna switch to connect said antenna to the input circuit of said receiver when said push-to-talk switch is released and to connect said antenna to the output circuit of said high power stage when said push-to-talk switch is closed, and means responsive to an overload condition in said high power stage to operate said second antenna switch and switch said antenna from the output circuit of the high power stage to the output circuit of the low power stage.

3. In a control circuit for a radio frequency communication system including in combination, a receiver, a transmitter having separately energized high and low power output stages, an antenna, a push-to-talk switch, first normally open switch means adapted when closed to energize said low power stage, second normally open switch means adapted when closed to energize said high power stage, a first antenna switch for selectively connecting said antenna to the input circuit of said receiver and to the output circuit of said low power stage, a second antenna switch normally closed to connect said antenna to the output circuit of said low power stage and operable to switch the antenna to the output circuit of said high power stage, means responsive to the closing of said push-to-talk switch for closing said first and second switch means, means to delay the closing of said second switch means for a period of time following the closing of said first switch means, means to operate said first antenna switch to connect said antenna to the input circuit of said receiver when said push-to-talk switch is released, means for connecting the output circuit of said low low power stage to the input circuit of said high power stage and for connecting said second antenna switch to connect said antenna to the output circuit of said high power stage when said push-to-talk switch is closed, and means responsive to an overload condition in said high power stage to operate both said second antenna switch and said connecting means to thereby switch said antenna from the output circuit of the high power stage to the output circuit of the low power stage and to disconnect the output circuit of the low power stage from the input circuit of the high power stage.

4. In a control circuit for a radio communication system including in combination, a transmitter having separately energized high and low power stages, an antenna, a remote push-to-talk switch adapted to be connected to energize when closed said high and low power stages, a local push- to-talk switch adapted to be connected to energize when closed said high and low power stages, a manual selector switch having a plurality of selector positions, a first selector position connecting said remote push-to-talk switch to control the energization of said high and low power stages, a second selector position connecting said local push-to-talk switch to control the energization of said high and lower power stages, and a third selector position modifying the connections of said local push-to-talk switch to control the energization only of said low power stage for purposes of tuning the low power stage, first antenna switch means operative in response to an overload condition of said high power stage for switching said antenna from the output circuit of said high power stage to the output circuit of said low power stage, and switching means responsive to the operation of said overload condition responsive means for disconnecting the output circuit of said low power stage from the input circuit of said high power stage, said switching means also being responsive to the operation of said selector switch in the third selector position to connect the output circuit of said low power stage to the input circuit of said high power stage for purposes of loading and tuning the low power stage.

5. In a radio communication system the combination including a transmitter having separately energized low and high power stages, a receiver, an antenna, a push-to-talk switch, first normally open switch means adapted when closed to energize said low power stage, second normally open switch means adapted when closed to energize said high power stage, antenna switching means for selectively connecting said antenna to said receiver and to said high and low power stages, circuit means responsive to operation of said push-to-talk switch for closing said first switch means, for closing said second switch means after a period of delay, and for operating said antenna switching means to connect said antenna to said high power stage, and means responsive to an overload condition of said high power stage for operating said antenna switching means to disconnect said antenna from said high power stage and to connect the same to said low power stage.

6. In a radio communication system the combination including a transmitter having separately energized low and high power stages, a receiver, an antenna, a push-to-talk switch, first normally open switch means adapted when closed to energize said low power stage, second normally open switch means adapted when closed to energize said high power stage, antenna switching means for selectively connecting said antenna to said receiver and to said high and low power stages, circuit means responsive to operation of said push-to-talk switch for closing said first switch means, for closing said second switch means after a period of delay, and for operating said antenna switching means to connect said antenna to said high power stage, said circuit means acting in response to release of said push-to-talk switch to operate said antenna switching means to connect said antenna to said receiver, to open said second switch means and to open said first switch means after a period of delay, and means responsive to an overload condition of said high power stage for operating said antenna switching means to disconnect said antenna from said high power stage and to connect the same to said low power stage, said last named means also operating to deenergize said high power stage in response to an overload condition.

7. In a radio communication system the combination including, a transmitter having separately energized high and low power output stages, an antenna, first antenna relay means adapted when actuated to connect the output circuit of said high power stage to said antenna, second antenna relay means adapted when actuated to connect the output circuit of said low power stage to said antenna, third relay means adapted when actuated to energize said high power output stage, and overload relay means actuated in response to an overload condition of said high power stage, said overload relay means including contacts normally closed for holding said first and third relay means actuated and opened by actuation of said overload relay means to release said first and third relay means to disconnect said high power stage from said antenna and deenergize said high power stage, said third relay means including contacts held open when said third relay means is actuated and closed in response to release of said third relay means for actuating said second relay means to connect said low power stage to said antenna.

8. In a radio communication system the combination including, a transmitter having separately energized high and low power stages, an antenna, antenna relay means including a first portion adapted when actuated to connect the output circuit of said high power stage to said antenna, and a second portion adapted when actuated to connect the output circuit of said low power stage to said antenna, power relay means adapted when actuated to energize said high power output stage, coupling relay means adapted when actuated to connect the output circuit of said low power stage to the input circuit of said high power stage, and overload relay means actuated in response to an overload condition of said high power stage, said overload relay means including contacts normally closed for holding said first portion of said antenna relay means and said power relay means actuated, said contacts being opened by actuation of said overload relay means to release said first portion of said antenna relay means and to release said power relay means, said power relay means including contacts held open when said power relay means is actuated and closed in response to release of said power relay means for actuating said second portion of said antenna relay means to connect said low power stage to said antenna, said overload relay means including contacts normally closed for holding said coupling relay means actuated and opened by actuation of said overload relay means to disconnect said high power stage from said low power stage.

9. In a radio communication system the combination including a transmitter having separately energized low and high power stages, a receiver, an antenna, a push-to-talk switch, first normally open switch means adapted when closed to energize said low power stage, second normally open switch means adapted when closed to energize said high power stage, antenna switching means normally connecting said antenna to said receiver and selectively operable for connecting said antenna to said high and low power stages, circuit means operating in response to operation of said push-to-talk switch for closing said first and second switch means for energizing said low power stage and said high power stage, said circuit means also operating in response to operation of said push-to-talk switch to operate said antenna switching means to connect said antenna to said high power stage, and means responsive to an overload condition of said high power stage for automatically operating said antenna switching means to disconnect said antenna from said high power stage and to connect the same to said low power stage, said overload responsive means also opening said second switch means for deenergizing said high power stage.

References Cited in the file of this patent

UNITED STATES PATENTS

| Number | Name | Date |
|---|---|---|
| 1,923,305 | Gebhard | Aug. 12, 1933 |
| 1,937,108 | Clement | Nov. 28, 1933 |
| 2,005,790 | Kramar et al. | June 25, 1935 |
| 2,179,363 | Watts | Nov. 7, 1939 |
| 2,223,049 | Reichle | Nov. 26, 1940 |
| 2,259,104 | Finch | Oct. 14, 1941 |
| 2,510,519 | Price | June 6, 1950 |